(12) United States Patent
Lee et al.

(10) Patent No.: US 7,269,423 B2
(45) Date of Patent: Sep. 11, 2007

(54) SYSTEM AND METHOD FOR CALL ADMISSION FOR A MOBILE COMMUNICATION SYSTEM

(75) Inventors: Sung-Won Lee, Songnam-shi (KR); Young-Ky Kim, Seoul (KR); Dong-Soo Park, Seoul (KR); Dong-Jun Lee, Songnam-shi (KR); Sang-Soo Kim, Songnam-shi (KR); Jin-Sung Cho, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 246 days.

(21) Appl. No.: 10/338,716

(22) Filed: Jan. 9, 2003

(65) Prior Publication Data
US 2003/0129988 A1 Jul. 10, 2003

(30) Foreign Application Priority Data
Jan. 9, 2002 (KR) .................. 10-2002-0001238

(51) Int. Cl.
*H04Q 7/20* (2006.01)
(52) U.S. Cl. .................. 455/452.1; 455/452.2; 455/453; 455/451; 455/450; 455/509; 370/235; 370/352; 370/232; 370/230
(58) Field of Classification Search .......... 455/450, 455/422.1, 452.1, 452.2, 451, 67.11, 512, 455/513, 514, 509, 453; 370/235, 352, 232, 370/230
See application file for complete search history.

(56) References Cited

U.S. PATENT DOCUMENTS

| | | | | |
|---|---|---|---|---|
| 5,917,804 A | * | 6/1999 | Shah et al. .................. 370/230 |
| 6,216,006 B1 | * | 4/2001 | Scholefield et al. ........ 455/450 |
| 6,377,548 B1 | * | 4/2002 | Chuah ......................... 370/233 |
| 6,421,529 B1 | * | 7/2002 | Wing et al. ................. 455/67.7 |
| 6,504,820 B1 | * | 1/2003 | Oliva .......................... 370/232 |
| 6,850,965 B2 | * | 2/2005 | Allen .......................... 709/203 |
| 2002/0091802 A1 | * | 7/2002 | Paul et al. .................. 709/220 |
| 2002/0167907 A1 | * | 11/2002 | Sarkar et al. ............... 370/252 |
| 2003/0032433 A1 | * | 2/2003 | Daniel et al. ............... 455/452 |
| 2003/0045319 A1 | * | 3/2003 | Sarkar et al. ............... 455/522 |
| 2003/0152028 A1 | * | 8/2003 | Raisanen et al. ........... 370/235 |
| 2004/0013089 A1 | * | 1/2004 | Taneja et al. ............... 370/235 |

FOREIGN PATENT DOCUMENTS

JP  11-041239  2/1999

(Continued)

*Primary Examiner*—Joseph Feild
*Assistant Examiner*—Khai Nguyen
(74) *Attorney, Agent, or Firm*—Roylance, Abrams, Berdo & Goodman, L.L.P.

(57) ABSTRACT

A QoS-based call admission system and method for a mobile communication system. To establish a call for a mobile station according to the QoS of the call, upon request of setup of a call requiring a QoS guarantee, a base transceiver station determines whether a channel element is available. In the presence of an available channel element, the base transceiver station determines whether a remaining bandwidth can support a data rate required to guarantee the QoS. If the data rate is supported, the base transceiver station assigns the channel element and connects its intra switch to a base station controller. Then the base transceiver station transmits a call accept response signal to the base station controller.

47 Claims, 11 Drawing Sheets

FOREIGN PATENT DOCUMENTS

| | | |
|---|---|---|
| JP | 11-331908 | 11/1999 |
| JP | 2001-177865 | 6/2001 |
| JP | 2001-217836 | 8/2001 |
| JP | 2001-308932 | 11/2001 |
| WO | WO99/11030 | 3/1999 |

\* cited by examiner

| SUBSCRIBER IDENTIFIER | AUTHENTICATION PARAMETER | ADDITIONAL INFORMATION | SUBSCRIBER CLASS | SUBSCRIBER QoS PARAMETER RECODER #1 |

| MSG TYPE | CODE | LENGTH |
|---|---|---|
| SUBSCRIBER IDENTIFIER | AUTHENTICATION PARAMETER | ADDITIONAL INFORMATION |

FIG.7

| MSG TYPE | CODE | LENGTH |
|---|---|---|
| SUBSCRIBER IDENTIFIER | AUTHENTICATION PARAMETER | ADDITIONAL INFORMATION |
| SERVICE TYPE #1 | SERVICE QoS PARAMETER RECODER #1 ||

⋮     ⋮

| SERVICE TYPE #1 | SERVICE QoS PARAMETER RECODER #1 |
|---|---|

FIG.8A

| MSG TYPE | CODE | LENGTH |
|---|---|---|
| SUBSCRIBER IDENTIFIER | AUTHENTICATION PARAMETER | ADDITIONAL INFORMATION |
| SUBSCRIBER CLASS | SERVICE QoS PARAMETER RECODER | |

SYSTEM AND METHOD FOR CALL ADMISSION FOR A MOBILE COMMUNICATION SYSTEM

PRIORITY

This application claims priority under 35 U.S.C. §119 to an application entitled "Call Admission Method for a Mobile Communication System" filed in the Korean Industrial Property Office on Jan. 9, 2002 and assigned Serial No. 2002-1238, the contents of which are incorporated herein by reference.

BACKGROUND OF THE INVENTION

1. Field of the Invention

The present invention relates generally to a call admission system and method in a mobile communication system, and in particular, to a system and method of determining whether to admit a new or handover call in a mobile communication system.

2. Description of the Related Art

A mobile communication system has been developed to provide voice and data service, ensuring user mobility. Thus an MS (Mobile Station) exchanges data with a BTS (Base Transceiver Station) on radio channels. In the mobile communication system, authentication of the mobile station is performed upon initiation of or request for a call.

Figure 1:
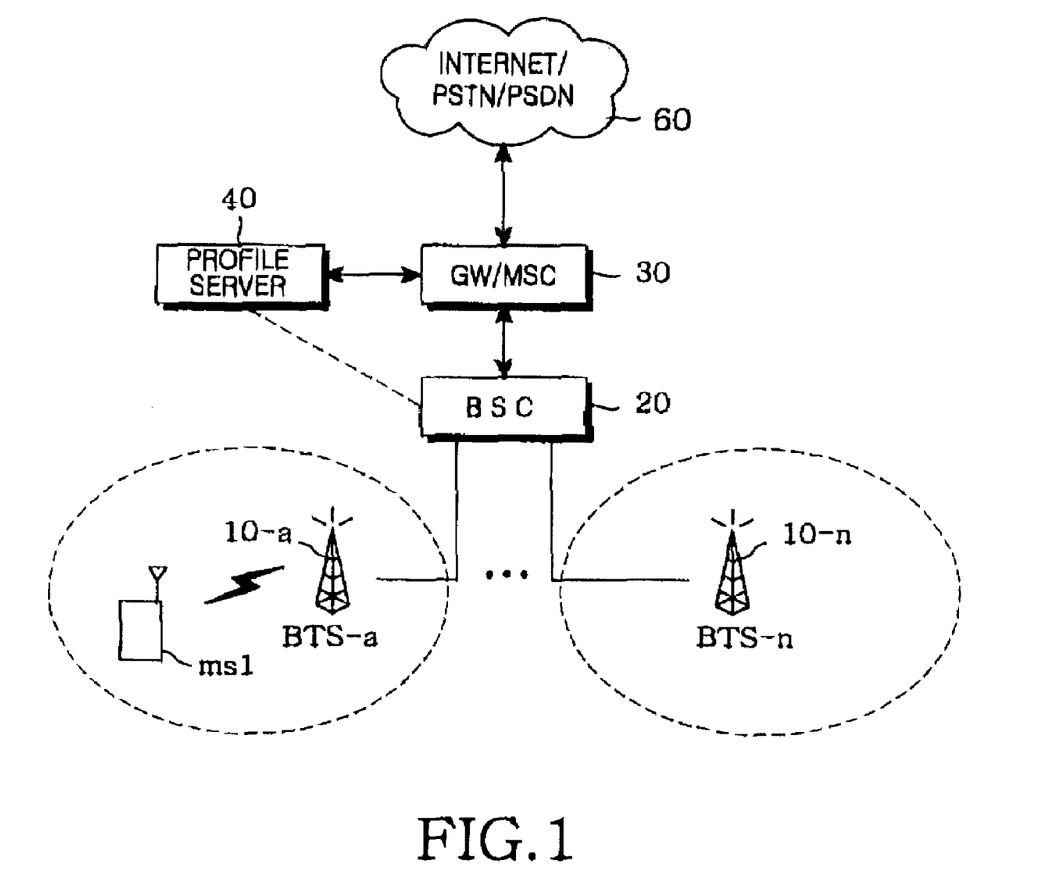
FIG. 1 illustrates connections between nodes in a conventional mobile communication system.

The configuration of the mobile communication system will be described with reference to FIG. 1. FIG. 1 illustrates connections between nodes in a typical mobile communication system.

Referring to FIG. 1, an MS 1 with mobility conducts voice or data communications with BTSs (BTS-a to BTS-n) 10-a to 10-n on radio channels. The BTSs 10-a to 10-n are controlled by a BSC (Base Station Controller) 20 and connected to each other over a network such as a WAN (Wide Area Network). The BSC 20 is connected to the Internet/PSTN (Public Switched Telephone Network)/PSDN (Public Switched Data Network) 60 through a gateway/mobile switching center (GW/MSC) 30, for call connection. The GW 30 is a logical name and is commonly referred to as a Packet Data Service Node (PDSN), Access Gateway (AGW), or Media Gateway (MGW).

A profile server 40 stores information in user profiles such as the Identifier (ID) of each subscriber and authentication parameter. A user profile is illustrated in Table 1 below.

TABLE 1

| Subscriber ID | Authentication Parameter | Additional Information |
| --- | --- | --- |

In Table 1, the user profile comprises a Subscriber ID that identifies a subscriber, an Authentication Parameter for authenticating a subscriber, and Additional Information. The profile server 40 is a logical entity. Physically, it can be integrated into the GW/MSC 30.

Figure 2:
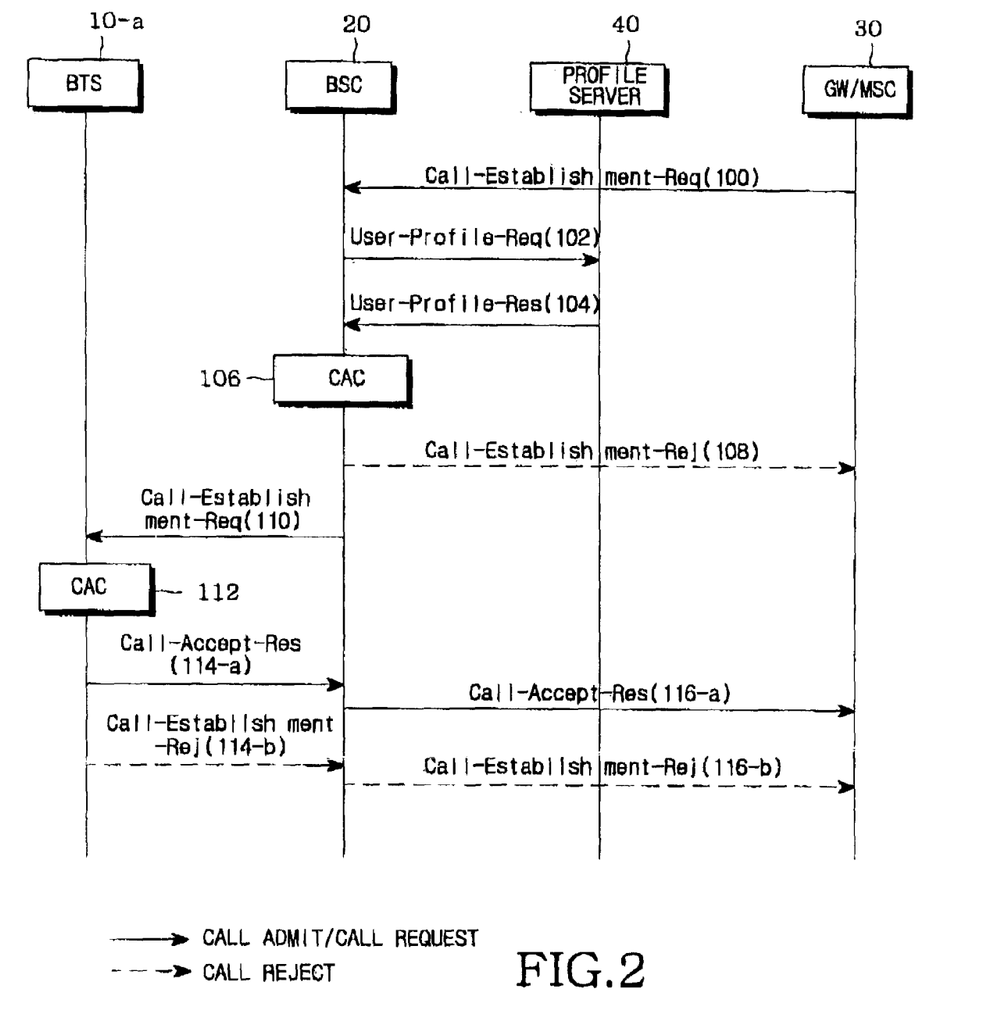
FIG. 2 is a diagram illustrating a signal flow for admitting or rejecting a call upon the detection of an incoming call in the mobile communication system.

FIG. 2 is a diagram illustrating a signal flow for an operation of admitting or rejecting an incoming call in the mobile communication system of FIG. 1.

When an originating node requests a call setup to the MS 1, the call setup request is connected to the mobile communication system. That is, a system to which the originating node belongs transmits a call setup request signal to the GW/MSC 30. The GW/MSC 30 then transmits a Call-Establishment-Req message to the BSC 20 in step 100. The BSC 20 transmits a User-Profile-Req message to the profile server 40 in step 102. In step 104, the profile server 40 generates a User-Profile-Res message by searching a user profile as illustrated in Table 1 and transmits it to the BSC 20. The User-Profile-Res message is constructed from either a part of or the whole of the contents of Table 1.

In step 106, the BSC 20 performs a CAC (Call Admission Control) operation to determine resource availability. If it is determined from the result of the resource availability check that the call cannot be admitted, the BSC 20 transmits a Call-Establishment-Rej message to the GW/MSC 30 in step 108. If the call is admitted, the BSC 20 transmits a Call-Establishment-Req message to the BTS 10-a in step 110. The BTS 10-a then performs a CAC operation to determine whether to admit the call in step 112. If the call is admitted, the BTS 10-a transmits a Call-Accept-Res message to the BSC 20 in step 114-a. If the call cannot be accepted, the BTS 10-a transmits a Call-Establishment-Rej message to the BSC 20 in step 114-b.

Upon receipt of the Call-Accept-Res message from the BTS 10-a, the BSC 20 forwards the Call-Accept-Res message to the GW/MSC 30 in step 116-a. However, upon receipt of the Call-Establishment-Rej message from the BTS 10-a, the BSC 20 forwards the Call-Establishment-Rej message to the GW/MSC 30 in step 116-b. In the above procedure, a call is either admitted or rejected during the call setup stage.

However, the CAC operations in the BSC 20 and the BTS 10-a involves only resource availability, and excludes the Quality of Service (QoS) of a call from consideration. No problems arise if a voice call, instant message, or simple Internet service is provided. Yet, one of the clear trends these days is the provision of various services including Video on Demand (VoD), Music on Demand (MoD), and Wireless ISP (W-ISP) to satisfy growing user demand for these services. These services often require real-time transmission. Thus, while a call is connected, a large amount of data must be transmitted continuously or for a Selected time. If a call is assigned by determining the availability of resources, it may occur that a user-requested data rate is not supported. If the BTS or BSC assigns a call requiring high-speed data transmission in the same manner as a voice service requiring low-speed data transmission, a required data rate cannot be ensured. Therefore, QoS is not guaranteed in the conventional call setup.

SUMMARY OF THE INVENTION

It is, therefore, an object of the present invention to provide a system and method of admitting a call by taking the QoS of the call into consideration in a mobile communication system.

It is another object of the present invention to provide a system and method of admitting a handover call by considering the QoS of the handover call in a mobile communication system.

It is a further object of the present invention to provide a system and method of admitting a call to ensure a continuous high data rate for an MS that receives a high-speed data service in a mobile communication system.

To achieve the above and other objects, a system and method of establishing a call for an MS according to the QoS of the call in a BTS communicable with the MS in a service system where the MS, the BTS, and a BSC are connected over a selected network, the NTS determines whether a CE (channel element) is available upon request for a call requiring QoS guarantee. If the CE is available, the BTS determines whether a remaining bandwidth can support a data rate required to guarantee the QoS of the call. If the data rate is supported, the BTS admits the call by assigning the CE and transmitting a call accept response signal to the BSC.

In a system and method of establishing a call for an MS according to the QoS of the call in a BSC in a service system where the MS, a BTS communicable with the MS, and the BSC are connected over a selected network, the BSC determines whether radio resources are available upon request of the MS for a call requiring QoS guarantee after the MS is authenticated according to QoS. If the radio resources are available, the BSC determines whether a remaining available bandwidth of the network connected to the BTS can support a minimum data rata required from the QoS of the call. If the bandwidth can support the minimum data rate, the BSC assigns the bandwidth and radio resources, and transmits a call establishment request signal to the BTS.

In a system and method of establishing a call for an MS according to the QoS of the call in a BSC in a service system having a profile server for storing the QoS profile information of the MS, where the MS, a BTS communicable with the MS, and the BSC are connected over a selected network, the BSC acquires the user profile information of the MS from the profile server upon receipt of a call setup request message including a QoS parameter, and compares the user profile information with the QoS parameter. If the user profile information includes the QoS parameter, the BSC determines whether radio resources are available within the BSC. If the radio resources are available, the BSC determines whether a remaining available bandwidth of the network connected to the BTS can support a minimum data rata required from the QoS of the call. If the bandwidth can support the minimum data rate, the BSC assigns the bandwidth and radio resources, and transmits a call establishment request signal to the BTS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several embodiments of the present invention will now be described in detail with reference to the accompanying drawings. Also, a detailed description of known functions and configurations have been omitted for conciseness.

A mobile communication system to which the present invention is applied is the same as the network configuration illustrated in FIG. 1, except for the profile server 40 and the CAC operations in the BTS 10-a and the BSC 20.

Figure 3A:
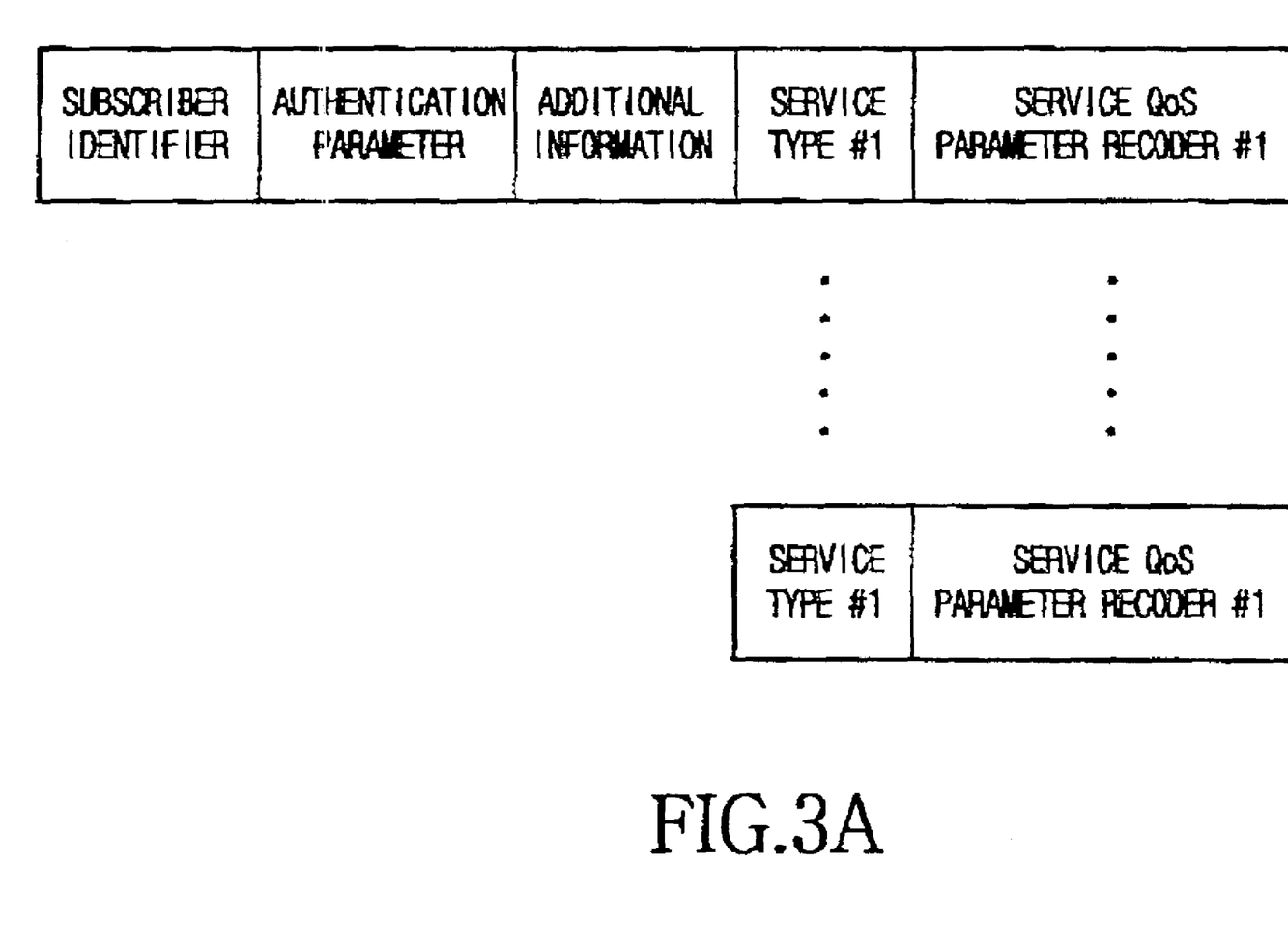
FIG. 3A illustrates an exemplary structure of a user profile database that includes Quality of Service (QoS) considerations when QoS is supported on a service basis in accordance with an embodiment of the present invention.
Figure 3B:
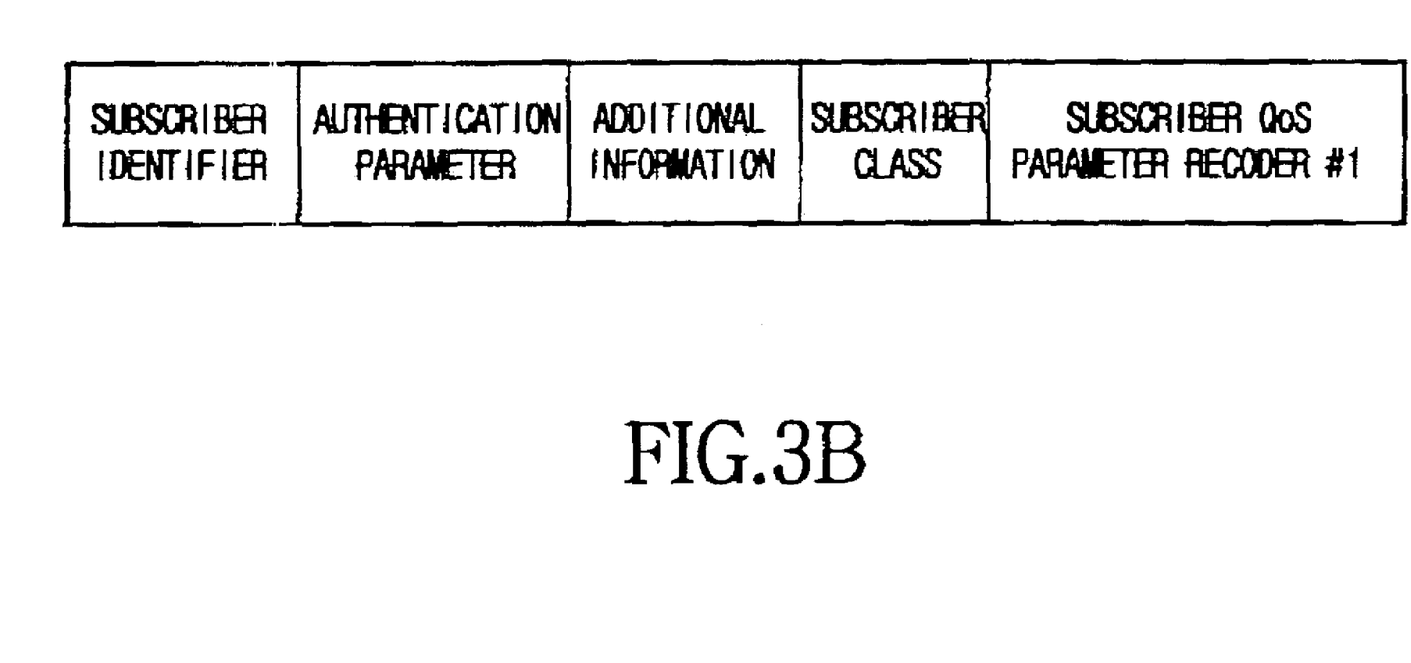
FIG. 3B illustrates an exemplary structure of a user profile database that includes QoS considerations when QoS is supported on a subscriber basis in accordance with an embodiment of the present invention.

While the profile server 40 has a user profile database as illustrated in Table 1 in the conventional technology, the user profile database is formed as illustrated in FIG. 3A or 3B in accordance with an embodiment of the present invention. The user profile database illustrated in FIG. 3A includes QoS considerations therein on a service basis, and the user profile database illustrated in FIG. 3B includes QoS considerations therein on a subscriber basis. Different CAC operations are performed in the BTS 10-a and the BSC 20 and thus messages exchanged between BTS 10-a and BSC 20 are also different in accordance with an embodiment of the present invention.

In accordance with an embodiment of the present invention, the user profile database is configured in the profile server 40 differently depending on whether QoS is applied on a service basis or on a subscriber basis.

Referring to FIG. 3A, when QoS is applied on a service basis, a user profile further includes a Service Type, indicating the type of service and a Service QoS Parameter Recorder containing a set of parameters related to a QoS level required from the service, in addition to the fields of the conventional user profile, e.g., Subscriber Identifier, Authentication Parameter, and Additional Information.

There are provided as many Service Type and Service QoS Parameter Recorder fields as the number of services with different QoS levels that a subscriber can receive. Service Type can indicate Voice, VoD, MoD, Web service, or File Transfer Protocol (FTP).

The Service QoS parameter Recorder is determined according to the definition of QoS that minimum x bits and maximum z bits are transmitted for y seconds.

Referring to FIG. 3B, when QoS is applied on a subscriber basis, a user profile further includes a Subscriber Class indicating the QoS class of a subscriber and a Subscriber QoS Parameter Recorder indicating a set of parameters related to a QoS level required from the subscriber class, in addition to the fields of the conventional user profile, Subscriber Identifier, Authentication Parameter, and Additional Information.

In the same manner as the Service QoS Parameter Recorder, the Subscriber QoS parameter Recorder is determined according to the definition of QoS that minimum x bits and maximum z bits are transmitted for y seconds.

Therefore, a different QoS-based CAC operation is performed depending on the QoS profile of a subscriber. From the definition of QoS, a data rate "R-rate" is defined to be one of the followings.

(1) Method 1: minimum x bits per y second;
(2) Method 2: maximum z bits per y second;
(3) Method 3: minimum x bits per y second with a weighting factor $\alpha$ ($\alpha \leq 1$); and
(4) Method 4: maximum z bits per y second with a weighting factor $\beta$ ($\beta \leq 1$).

In Method 1, a call is admitted if the call's minimum required bandwidth is satisfied and a mobile communication network must render the minimum band available for the call. In Method 2, a call is admitted if the call's maximum required bandwidth is satisfied and the mobile communication network must render the maximum bandwidth available for the call. Method 3 and Method 4 are based on the principle that packet data service does not always require a minimum or maximum bandwidth but it does require a minimum and maximum bandwidth when traffic is active on the network. Therefore, for Methods 3 and 4, a bandwidth narrower than actually required is maintained by multiplying the minimum or maximum band by a selected weighting factor in order to increase the statistical use efficiency of radio resources. This prevents the inefficient use of radio resources as encountered in the use Method 1 and Method 2 in the mobile communication network.

Figure 4:
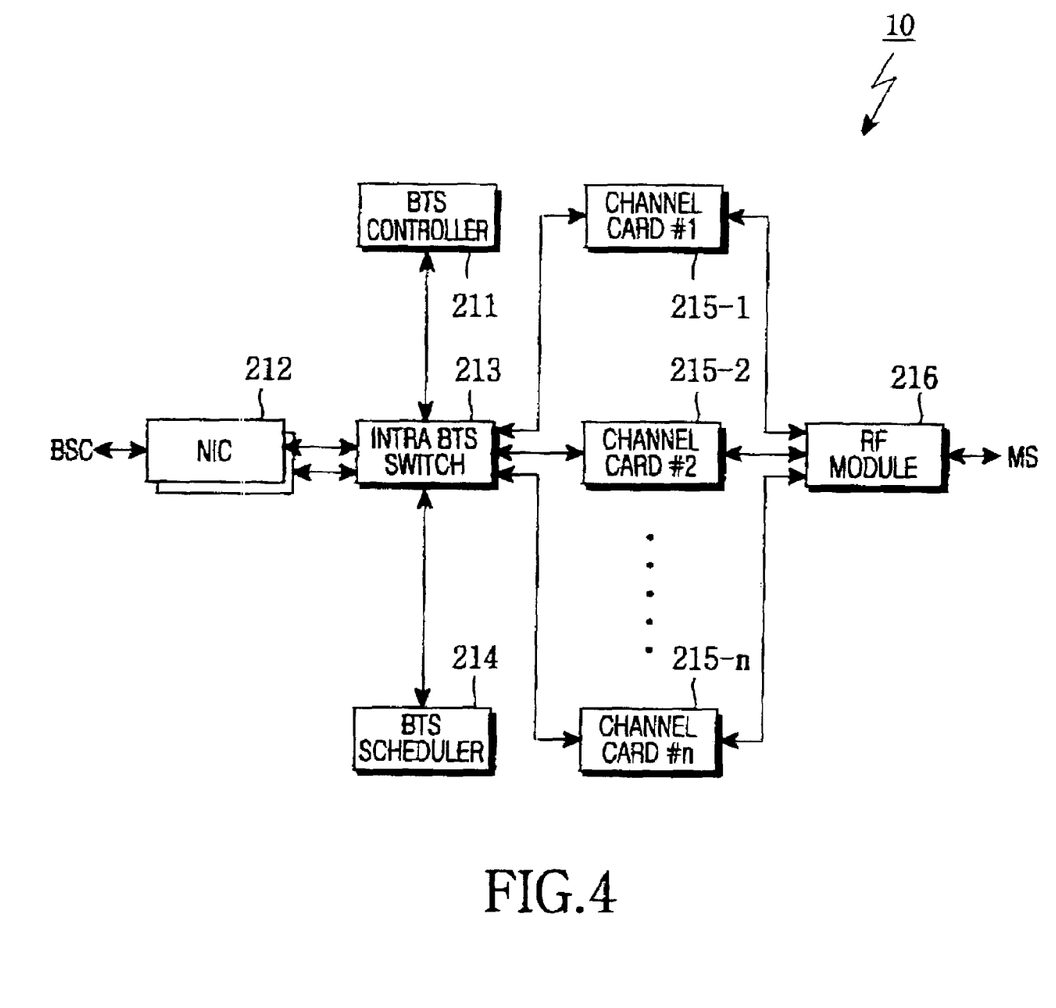
FIG. 4 is an example of a block diagram of a Base Transceiver Station (BTS) that supports QoS-based service provisioning in accordance with an embodiment of the present invention.

FIG. 4 is an example of a block diagram of a BTS that supports QoS-based service provisioning in accordance with an embodiment of the present invention. Referring to FIG. 4, the structure of the BTS, a CAC operation in the BTS, and related messages will be described below.

A BTS 10 in accordance with an embodiment of the present invention is connected to the BCS 20 via double Network Interface Cards (NICs) or Line Interface Cards (LICs) 212. The NICs 212 are connected to an intra-BTS switch (or router) 213. Thus the NICs 212 interface data between the BTS 10 with the BSC 20. The intra-BTS switch 213 switches received data under the control of a BTS controller 211.

The BTS controller 211 manages resources within the BTS 10 and controls each function block. The BTS controller 211 also performs call authentication according to radio channel information of the BTS 10 received from a radio scheduler e.g., BTS scheduler 214, depending on whether a received call is a general non-QoS-based call or a QoS-based call. The BTS controller 211 receives a QoS message from the BSC 20 and determines whether to admit a new call or a handover call according to the QoS message.

The BTS 10 is provided with channel cards 215-1 to 215-n, each card being assigned to one user, for processing input data for each of the users. That is, each channel card processes data received from an Radio Frequency (RF) module 216 by, for example, decoding, and providing the processed data to the intra-BTS switch 213, processing data received from the intra-BTS switch 213 by, for example, encoding, and providing the processed data to the RF module 216. The RF module 216 upconverts data received from the channel cards 215-1 to 215-n to RF signals in a transmission band and transmits the RF signals. The RF module 216 also downconverts RF signals received from Mobile Stations (MSs) to signals in a selected transmission band and transmits the signals to the channel cards 215-1 to 215-n.

The BTS scheduler 214 is used to provide efficient use of radio resources. In an embodiment of the invention, the BSC scheduler 214 is integrated into the channel cards 215-1 to 215-n. In another embodiment of the invention, the BSC scheduler 214 operates as a separate processor. The BTS scheduler 214 controls scheduling in accordance with an embodiment of the present invention.

Figure 5:
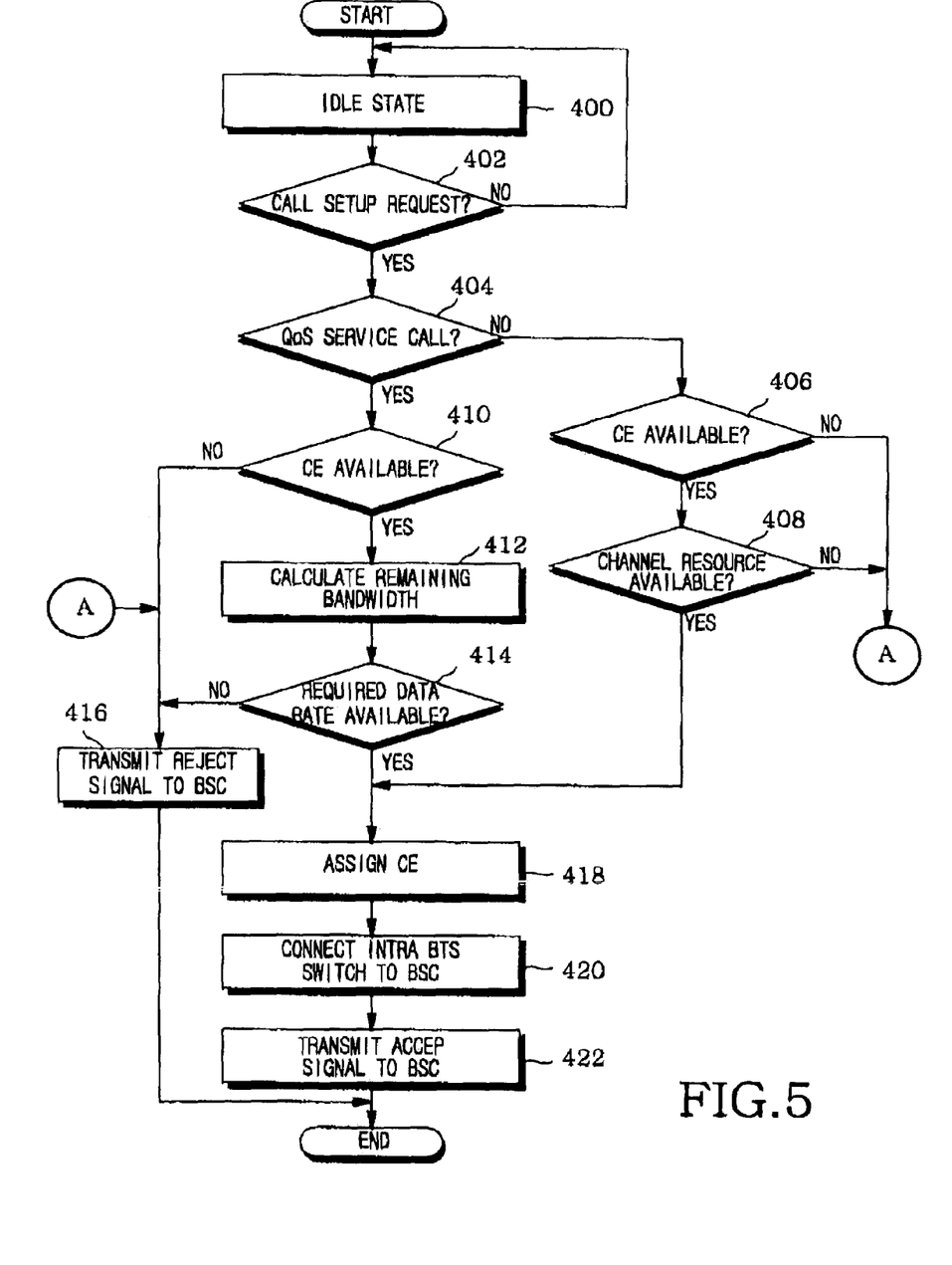
FIG. 5 is a flowchart illustrating an example of steps for performing a QoS-based Call Admission Control (CAC) operation in the BTS in accordance with an embodiment of the present invention.

FIG. 5 is a flowchart illustrating an example of steps for performing a QoS-based CAC operation in the BTS in accordance with an embodiment of the present invention.

Referring to FIG. 5, the BTS controller 211 is in an idle state in step 400. The idle state is a state where the BTS controller 211 waits for a call. In step 402, the BTS controller 211 determines whether a call setup request has been received. The call setup request can be generated from the MS 1, from the MSC 30, or from a handover call. If the MS 1 requests a call setup, the CAC operation preferably includes the step of providing authentication in the profile server 40 and QoS-based authentication in accordance with an embodiment of the present invention after step 402.

Upon request for a call setup, the BTS controller 211 proceeds to step 404, otherwise, BTS controller 211 returns to step 400. In step 404, the BTS controller 211 determines whether the call requires a QoS guarantee, that is, whether the call is a QoS service call. If a QoS guarantee is required, the BTS controller 211 proceeds to step 410 and if a QoS guarantee is not required, the BTS controller 211 proceeds to step 406. In step 406, the BTS controller 211 determines the availability of a channel element (CE) as is performed in the conventional technology. If a CE is available, the BTS controller 211 proceeds to step 408 and otherwise, the BTS controller 211 proceeds to step 416. In step 408, the BTS controller 211 determines whether a channel resource for Non QoS subscriber is available. The BTS controller can assign a part of operator's entire channel resources for Non QoS subscriber or remaining portion except for the channel resources used by QoS subscriber.

If the channel resource is available, the BTS controller 211 proceeds to step 418 otherwise, the BTS controller 211 proceeds to step 416.

Meanwhile, if the call requires a QoS guarantee in step 404, the BTS controller 211 determines the availability of a CE in step 410. If a CE is available, the BTS controller 211 proceeds to step 412 otherwise, the BTS controller 211 proceeds to step 416. In step 416, the BTS controller 211 transmits a Call-Establishment-Rej message to the BSC 20.

In step 412, the BTS controller 211 calculates a remaining available bandwidth using the following formula $$\text{Remaining Bandwidth} = \text{overall available bandwidth} - \text{badnwidth in use} \qquad (1)$$

Then the BTS controller 211 determines whether a data rate required to guarantee the QoS of the call can be supported in step 414. If it can, the BTS controller 211 proceeds to step 418 otherwise, the BTS controller 211 proceeds to step 416.

The BTS controller 211 assigns the CE in step 418, and assigns the intra-BTS switch 213 to the BSC 20 and controls the NICs 212 to establish a channel for communication with the BSC 20 in step 420. In step 422, the BTS controller 211 transmits a Call-Accept-Res message to the BSC 20. Thus the BTS 10 establishes a channel with the MS 1 and sets up the call.

Figure 6:
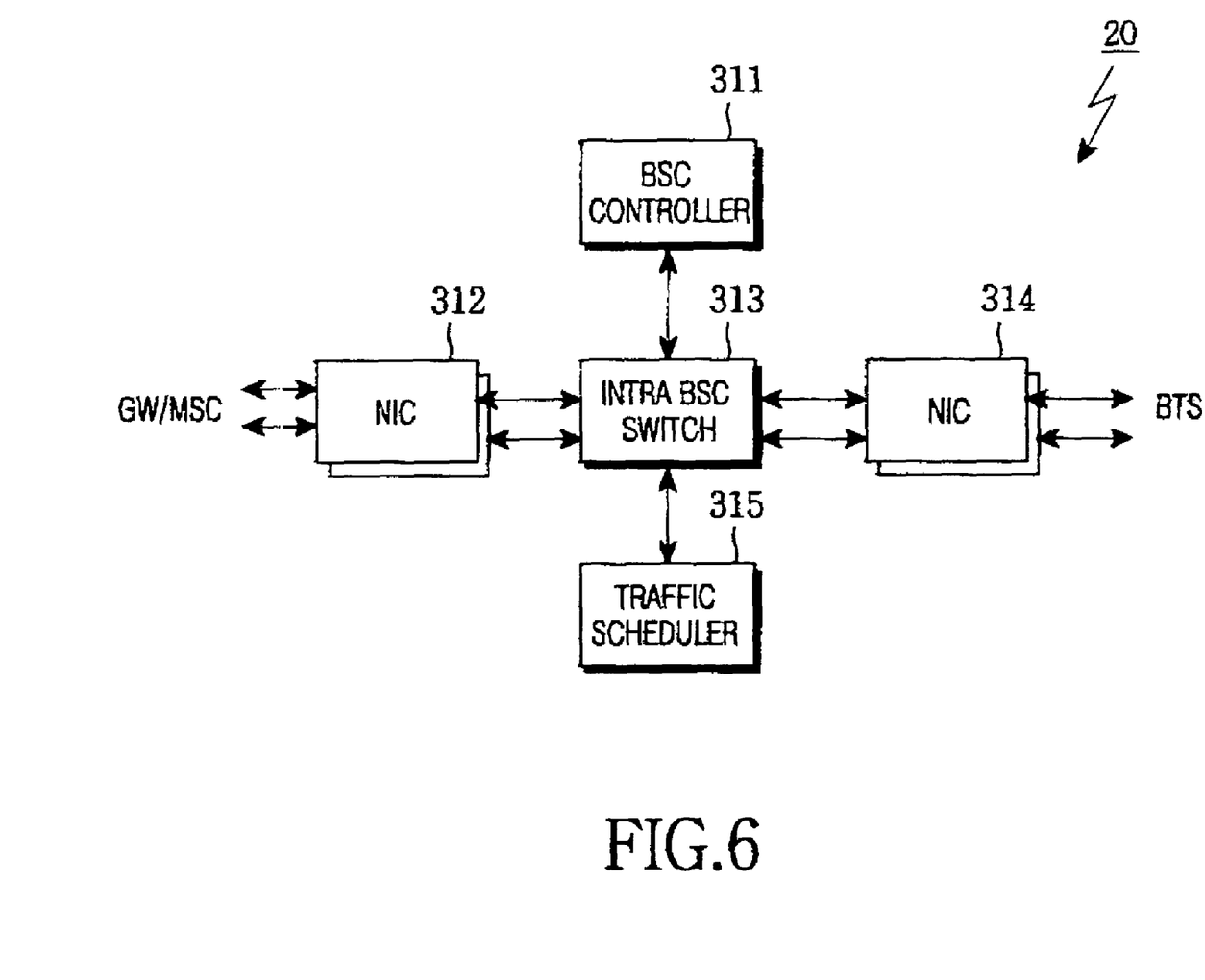
FIG. 6 is an example of a block diagram of a Base Station Controller (BSC) that supports QoS-based service provisioning in accordance with an embodiment of the present invention.

FIG. 6 is an example of a block diagram of a BSC that supports QoS-based service provisioning in accordance with an embodiment of the present invention.

Referring to FIG. 6, the BSC 20 includes an NIC 312 connected to the GW/MSC 30, for interfacing between the BSC 20 and the GW/MSC 30. Another NIC 314 is connected to the BTS 10, for interfacing between the BSC 20 and the BTS 10. The NICs 312 and 314 are identical to the NICs 212 in the BTS 10.

An intra-BSC controller 313 switches data within the BSC 20. That is, the BSC controller 313 is connected between the NICs 312 and 314, for transmitting and receiving data to and from the NICs 312 and 314. It also switches data received from the NICs 312 and 314 to a BSC controller 311 or to a traffic scheduler 315.

The BSC controller 311 provides overall control to the BSC 20 and controls the resources of the BSC 20 and part of the resources of the BTS 10. In accordance with an embodiment of the present invention, the BSC controller 311 controls QoS-based call connection. The traffic controller 315 controls Selection and Distribution Unit/Radio Link Protocol (SDU/RLP) (not shown) processing and signal processing. The SDU extracts the best-quality information from the information received from a plurality of BTSs in a CDMA communication network. The SDU also functions to deliver information to a particular MS through one or a plurality of BTSs.

Figure 7:
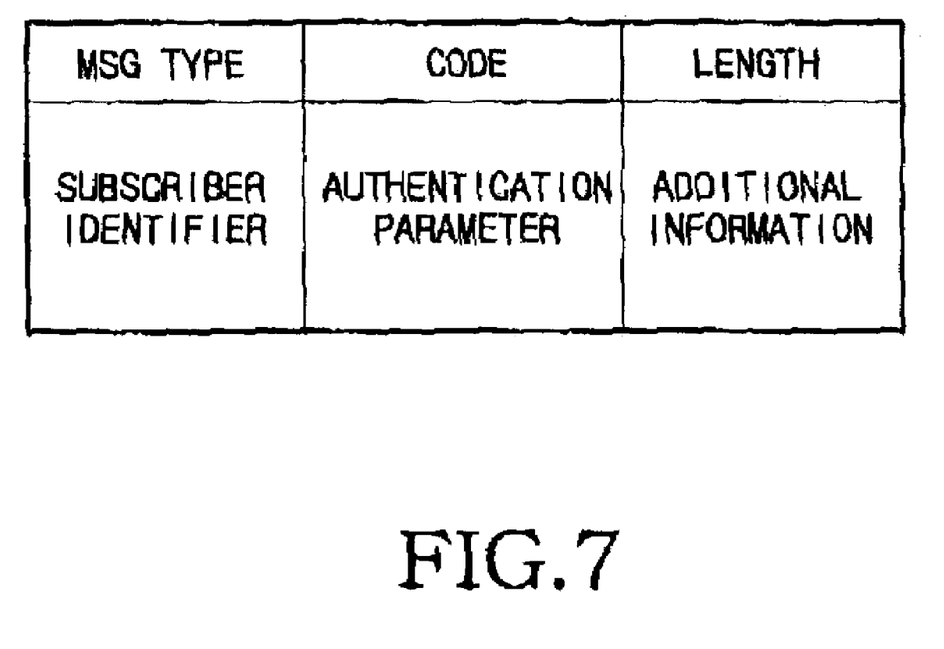
FIG. 7 illustrates a conceptual format of messages exchanged for call setup and authentication in the conventional mobile communication system.

A conceptual format of data exchanged for call authentication or admission between the BSC 20 and the BTS 10, and between the BSC 20 and the profile server 40 for a conventional system is illustrated in FIG. 7. Referring to FIG. 7, MSG Type indicates the type of message. MSG Type further identifies Call-Establishment-Req, Call-Establishment-Res, User-Profile-Req, or User-Profile-Res messages. Information about the code and length of a corresponding message is set in Code and Length, respectively of FIG. 7. When user profile information is required, Subscriber Identifier, Authentication Parameter, and Additional Information are added. That is, the contents of Table 1 are used for authentication or admission. In order to admit or reject a call based on the QoS of the call in accordance with an embodiment of the present invention, a Service Type or a Subscriber Class must be further included in the message structure of FIG. 7. This embodiment of the invention is described with reference to FIGS. 8A and 8B.

Figure 8A:
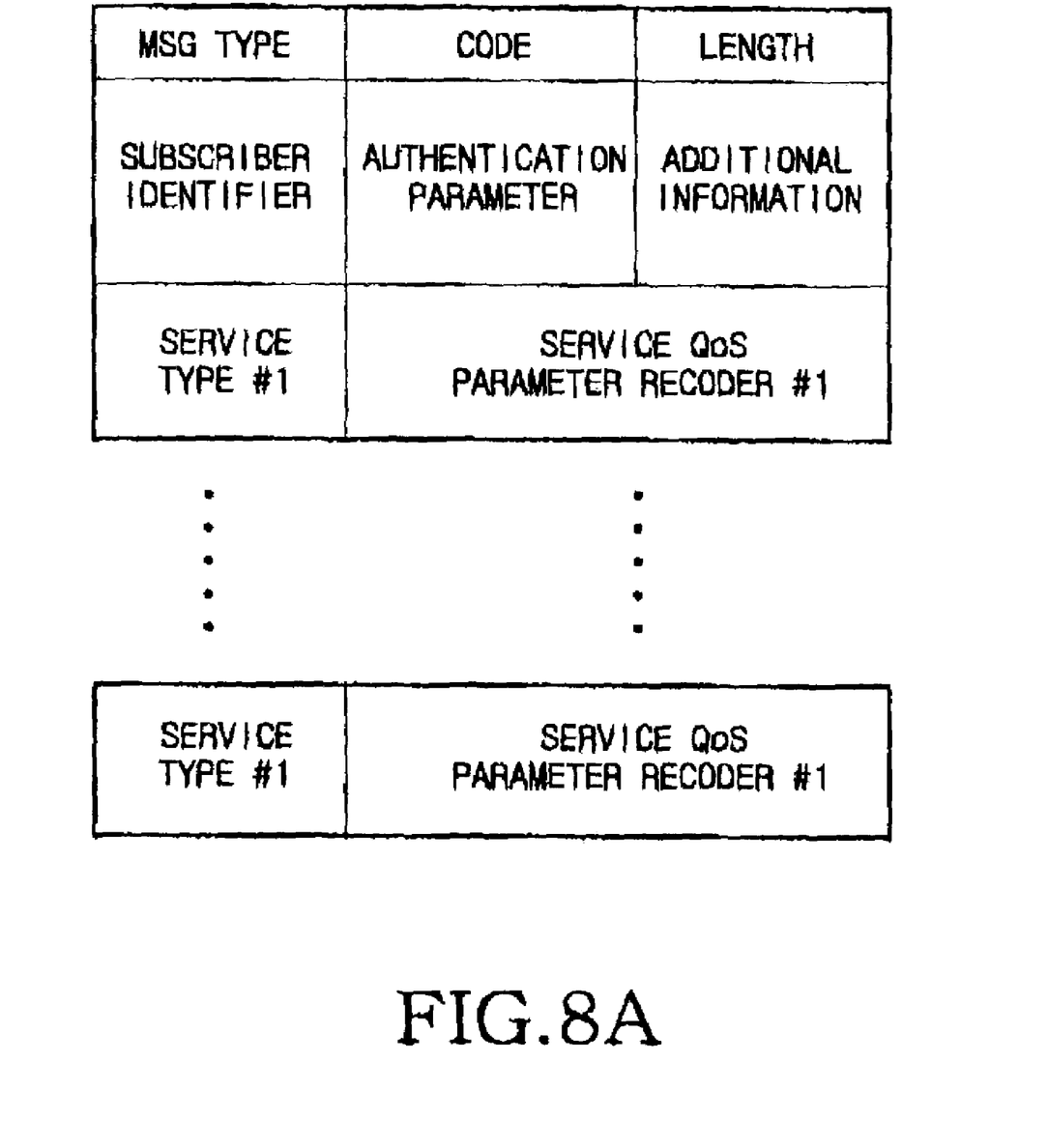
FIG. 8A illustrates an example of a conceptual format for a message transmitted from a profile server when QoS is supported on a service basis in accordance with an embodiment of the present invention.

FIG. 8A illustrates an example of a conceptual structure of a message transmitted from the profile server 40 when QoS is supported on a service basis in accordance with an embodiment of the present invention. Service Types and Service QoS Parameter Recorders are added to the typical message structure illustrated in FIG. 7. These parameters are delivered from the profile server 40 to the BSC 20 and from the BSC 20 to the BTS 10, in order to determine the availability of required resources when a channel is assigned for a call setup. The message structure of FIG. 8A is constructed to provide corresponding Service Type and Service QoS Parameter Recorder among parameter fields stored in the profile server 40, or to provide all Service Types and Service QoS Parameter Recorders.

Figure 8B:
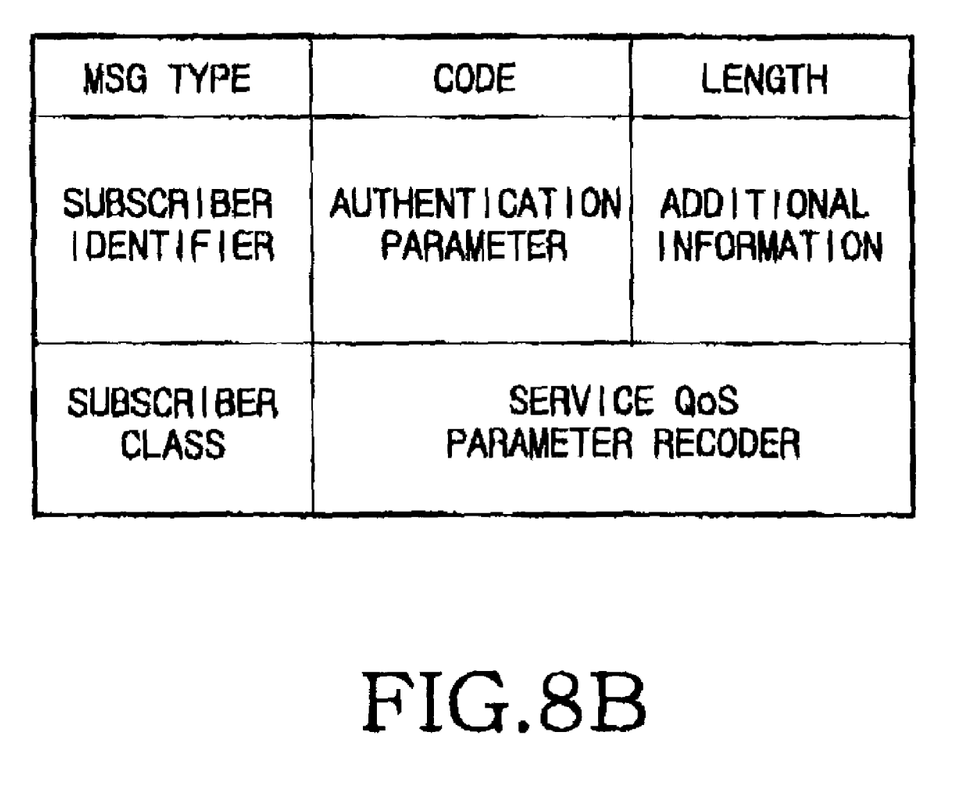
FIG. 8B illustrates an example of a conceptual format for a message transmitted from the profile server when QoS is supported on a subscriber basis in accordance with an embodiment of the present invention.

FIG. 8B illustrates an example of a conceptual structure of a message transmitted from the profile server 40 when QoS is supported on a subscriber basis in accordance with an embodiment of the present invention. Subscriber Class and Subscriber QoS Parameter Recorder are added to the typical message structure of FIG. 7. This message structure is constructed to provide Subscriber Class and Subscriber QoS Parameter Recorder stored in the profile server 40. The message structures illustrated in FIGS. 8A and 9B match the user profiles illustrated in FIGS. 3A and 3B, respectively.

Figure 9:
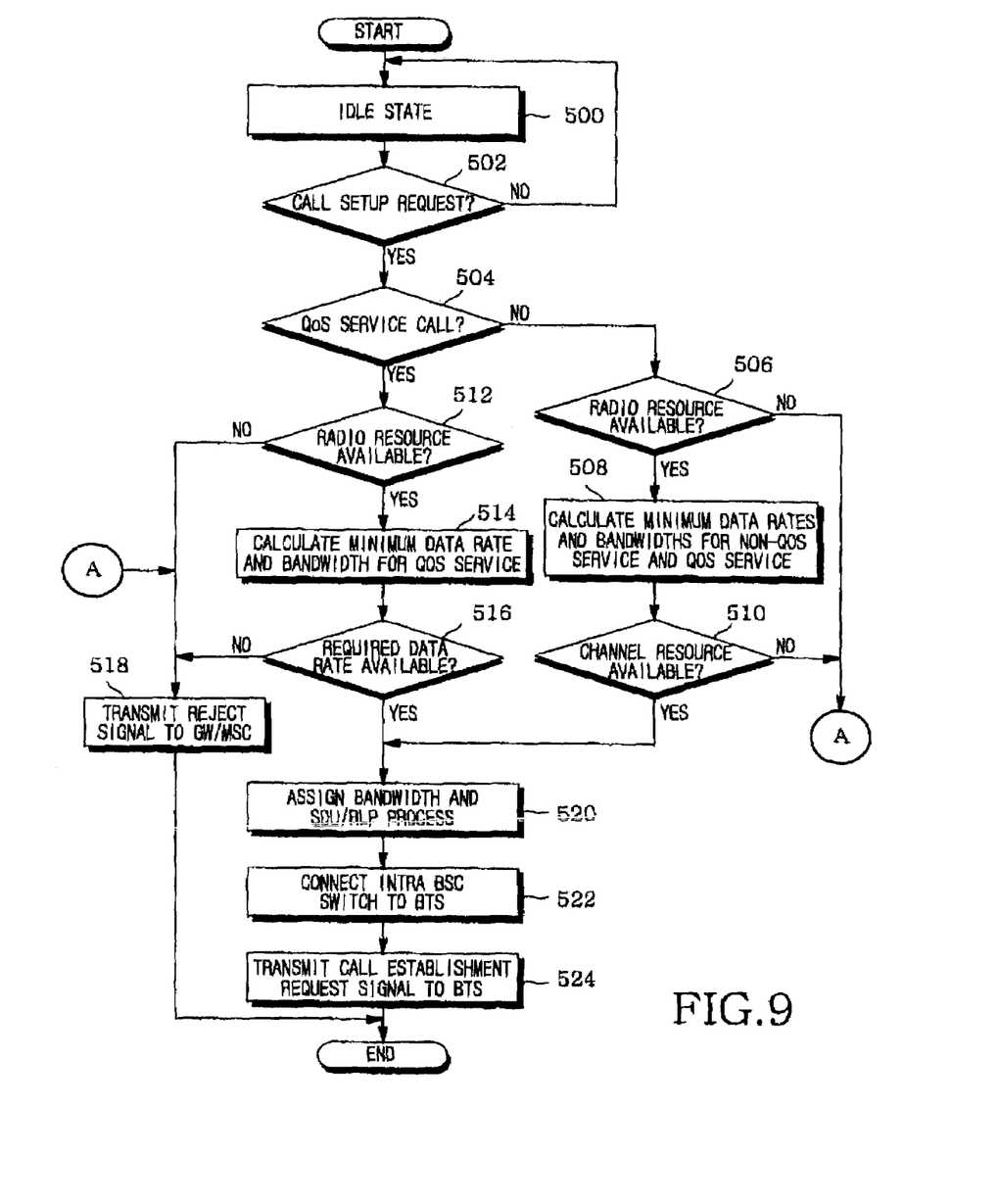
FIG. 9 is a flowchart illustrating an example of steps for performing a QoS-based CAC operation in the BSC in accordance with an embodiment of the present invention.

FIG. 9 is a flowchart illustrating an example of steps for performing a QoS-based CAC operation in the BSC in accordance with an embodiment of the present invention.

Referring to FIG. 9, the BSC controller 311 is in an idle state in step 500. The idle state is a state prior to an event being generated, where the BSC controller 311 controls call maintenance and system management. The event can be a request for processing to initiate, discontinue, or release a call. In step 502, the BSC controller 311 determines whether a call setup request has been received from the NIC 312 through the intra BSC switch 313. Upon receipt of the call setup request, the BSC controller 311 proceeds to step 504 otherwise, the BSC controller 311 returns to step 500.

The BSC controller 311 determines whether the requested call requires a QoS guarantee and checks the service type of the call and its requirements in a message received from the MSC 30 in step 504. The message is preferably in the format illustrated in FIG. 8A or 8B. The MSC 30 receives the message from the profile server 40 and forwards it to the BSC 20. If the call requires a QoS guarantee, the BSC controller 311 proceeds to step 512 otherwise, the BSC controller 311 proceeds to step 506.

In the conventional technology, the MSC 30 does not provide the message received from the profile server 40 to the BSC 20. As described with reference to FIG. 2, the BSC 20 performs steps 102 and 104 in the conventional call admission method. However, in accordance with an embodiment of the present invention, the MSC 30 provides the message received from the profile server 40 to the BSC 20.

If the BSC 20 performs steps 102 and 104 as in the conventional technology, it determines whether the call requires the QoS service by checking whether a QoS parameter is included in a Call-Establishment-Req message., If the QoS parameter is not included, the BSC 20 requests the profile of a user for which the call is to be set up to the profile server 40 and acquires it. The BSC 20 then determines whether a required QoS parameter can be provided by checking the received user profile in the format of FIG. 8A or 8B. If the service is available, that is, the user profile includes the QoS parameter, the BSC controller 311 goes to step 512.

In the case where the call does not require a QoS guarantee, in step 504 the BSC controller 311 determines whether radio resources are available, that is, whether the SDU/RLP resources with which to establish a communication path with the MS are available in the BSC 20 in step 506. While the traffic controller 315 assumes control of the SDU/RLP, the BSC controller 311 determines the availability of resources. The traffic controller 315 also manages the resources instead of the BSC controller 311. In the presence of available radio resources, the BSC controller 311 proceeds to step 508 otherwise, the BSC controller 311 rejects the call request in step 518. Step 518 will be described later in more detail.

In step 508, the BSC controller 311 calculates minimum data rates and bandwidths between the BSC 20 and the BTS 10 for the cases of QoS service and non-QoS service. As described above, the BSC 20 and the BTS 10 are connected over a WAN or via an E1/T1 trunk. The BSC controller 311 determines the availability of the call to the Non-QoS subscriber based on the remaining bandwidth in step 510. If it is available, the BSC controller 311 proceeds to step 520 otherwise, the BSC controller 311 proceeds to step 518.

Now, a description will be made of the case where the BSC controller 311 proceeds from step 504 to step 512 or the case where a Call-Establishment-Req message containing a QoS parameter is received and a corresponding called MS can support the QoS of the service.

In step 512, the BSC controller 311 determines whether radio resources, that is, SDU/RLP resources are available in the BSC 20. In the presence of radio resources, the BSC controller 311 proceeds to step 514 otherwise, the BSC controller 311 rejects the call request instep 518. In step 514, the BSC controller 311 calculates a minimum data rate and a bandwidth between the BSC 20 and the BTS 10 for the QoS service and determines whether a requested data rate is supported with the remaining bandwidth in step 516. In step 514, the BSC controller 311 calculate a remaining bandwidth using the following formula;

Remaining Bandwidth=overall available bandwidth between BTS and BSC–Bandwidth in used between BTS and BSC In step 520, the BSC controller 311 assigns the bandwidth to the BTS 10 according to the requested data rate and assigns radio resource within the BSC 20. Then the BSC controller 311 connects the BSC switch 313 to the BTS 10 in step 522. Thus, a channel is established between the NSC 20 and the BTS 10. The BSC controller 311 transmits a Call-Establishment-Req message in the format illustrated in FIG. 8A or 8B to the BTS 10 in step 524.

Upon receipt of the Call-Establishment-Req message, the BTS 10 performs a CAC operation and transmits a corresponding response to the BSC. Then the call is rejected or admitted according to the QoS of the call.

In accordance with the present invention, a CAC can provide a QoS guarantee. In the CAC operation, a call is admitted only if a requested data rate corresponding to a subscriber class or a service class is supported. Furthermore, if the service requires a QoS guarantee, a subscriber can receive a service reliably even if traffic congestion exists.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of establishing a call for a Mobile Station (MS) according to a Quality of Service (QoS) of the call in a Base Transceiver Station (BTS) communicable with the MS in a service system where the MS, the BTS, and a Base Station Controller (BSC) are connected over a selected network, the method comprising the steps of:
   receiving a call setup request message including a QoS parameter from the MS;
   determining whether the call requires a QoS guarantee by checking the QoS parameter;
   calculating a remaining available bandwidth;
   determining whether the remaining available bandwidth can support a data rate required for the QoS guarantee of the call according to a user profile information acquired from a profile server if the call requires the QoS guarantee; and
   admitting the call and transmitting a call accept response signal to the BSC, if the data rate is supported or if the call does not require the QoS guarantee.

2. The method of claim 1, further comprising the step of determining whether a channel element (CE) is available for a call required to guarantee the QoS.

3. The method of claim 2, further comprising the step of assigning the channel element if the data rate is supported.

4. The method of claim 1, further comprising the step of admitting the call by transmitting the call accept response signal to a BSC, if a channel resource for non QoS subscriber is available.

5. The method of claim 1, wherein the data rate is supported if a minimum bandwidth required based on a QoS parameter for the call is available.

6. The method of claim 1, wherein the data rate is supported if a maximum bandwidth required based on the QoS parameter is available.

7. The method of claim 1, wherein the data rate is supported if the product of the minimum bandwidth and a selected first factor is available.

8. The method of claim 1, wherein the data rate is supported if the product of the maximum bandwidth and a selected second factor is available.

9. The method of claim 1, further comprising the step of assigning a BTS switch to the call if the data rate is supported.

10. A method of establishing a call for a Mobile Station (MS) according to the Quality of Service (QoS) of the call in a Base Station Controller (BSC) in a service system where the MS, a Base TransceiVer Station (BTS) communicable with the MS, and the BSC are connected over a selected network, the method comprising the steps of:
    receiving a call setup request message including a QoS parameter:
    determining whether the call requires a QoS guarantee by checking whether the QoS parameter is included in the call setup message;
    calculating a remaining available bandwidth between the BTS and BSC;
    determining whether a remaining available bandwidth of the network connected to the BTS can support a minimum data rate required based on the QoS of the call assigning the bandwidth according to a user profile database in a profile server; and
    transmitting a call establishment request signal to the BTS, if the bandwidth can support the minimum data rate or if the call does not require the QoS guarantee.

11. The method of claim 10, further comprising the step of determining whether a channel element (CE) is available for a call required to guarantee the QoS.

12. The method of claim 10, further comprising the step of assigning the radio resources.

13. The method of claim 10, further comprising the step of admitting the call by transmitting a call accept response signal to at least one of a GateWay and an MSC (Mobile Switching Center), if a channel resource for non QoS subscriber is available.

14. The method of claim 10, wherein the data rate is supported if a minimum bandwidth required based on a QoS parameter for the call is available.

15. The method of claim 10, wherein the data rate is supported if a maximum bandwidth required based on a QoS parameter is available.

16. The method of claim 10, wherein the data rate is supported if the product of a minimum bandwidth and a selected first factor is available.

17. The method of claim 10, wherein the data rate is supported if the product of a maximum bandwidth and a selected second factor is available.

18. The method of claim 10, further comprising the step of connecting a BSC switch to the BTS if the network connected to the BTS has a bandwidth available to support a minimum data rate required based on the QoS of the call.

19. A method of establishing a call for a Mobile Station (MS) according to the Quality of Service (QoS) of the call in a Base Station Controller (BSC) in a service system having a profile server for storing the QoS profile information of the MS, where the MS, a Base Transceiver Station (BTS) communicable with the MS, and the BSC are connected over a selected network, the method comprising the steps of:
receiving a call setup request message including a QoS parameter;
requesting the user profile information of the MS to the profile server;
determining whether radio resources are available within the BSC if the user profile information includes the QoS parameter and the QoS parameter requires a QoS guarantee;
determining whether a remaining available bandwidth of the network connected to the BTS can support a minimum data rate required based on the QoS requirements of the call if the radio resources are available;
assigning the bandwidth and the radio resources; and
transmitting a call establishment request signal to the BTS, if the bandwidth can support the minimum data rate or if the call does not require the QoS guarantee.

20. The method of claim 19, further comprising the step of admitting the call by transmitting a call accept response signal to at least one of a GateWay and an Mobile Switching Center (MSC), if a channel resource for non QoS subscriber is available.

21. The method of claim 19, wherein the data rate is supported if a minimum bandwidth required from the QoS parameter is available.

22. The method of claim 19, wherein the data rate is supported if a maximum bandwidth required from the QoS parameter is available.

23. The method of claim 19, wherein the data rate is supported if a product of the minimum bandwidth and a selected first factor is available.

24. The method of claim 19, wherein the data rate is supported if a product of the maximum bandwidth and a selected second factor is available.

25. The method of claim 19, further comprising the step of connecting a BSC switch to the BTS if the network connected to the BTS has a bandwidth available to support a minimum data rate required based on the QoS of the call.

26. A system for establishing a call over a communication network
according to the Quality of Service requirement for the call, the system comprising:
a mobile station, a base transceiver station, a base transceiver station controller, a base station controller and a profile server;
said base station transceiver controller being adapted to receive a call setup message including a QoS parameter and determine if said call requires a QoS guarantee by checking whether a QoS parameter is included in a call setup message, calculate a remaining available bandwidth, determine whether a remaining bandwidth can support a data rate required to guarantee the QoS of the call, admit the call if the data rate is supported or if the call does not require the QoS guarantee and transmit a call accept response signal to the base station controller;
said profile server being adapted to maintain a user profile database comprising QoS parameters and to provide QoS parameters to said base station if requested by said base station.

27. The system of claim 26, wherein said base station transceiver controller is adapted to determining whether a channel element (CE) is available for a call required to guarantee the QoS.

28. The system of claim 27, wherein said base station transceiver controller is adapted to assign the channel element if the data rate is supported.

29. The system of claim 26, wherein said base station transceiver controller is adapted to admit the call by transmitting the call accept response signal to the base station controller, if the call does not require the QoS guarantee and if a channel resource for non QoS subscriber is available.

30. The system of claim 29, wherein said base station transceiver controller is adapted to determine whether the data rate is supported if the product of the minimum bandwidth and a selected first factor is available.

31. The system of claim 26, wherein said base station transceiver controller is adapted to determine whether the data rate is supported if a minimum bandwidth required based on a QoS parameter for the call is available.

32. The system of claim 26, wherein said base station transceiver controller is adapted to determine whether the data rate is supported if a maximum bandwidth required based on the QoS parameter is available.

33. The system of claim 26, wherein said base station transceiver controller is adapted to determine whether the data rate is supported if the product of the maximum bandwidth and a selected second factor is available.

34. A system for establishing a call over a communication network according to the Quality of Service requirement for the call, the system comprising:
a mobile station, a base transceiver station, a base station controller and a profile server;
said base station controller being adapted to receive a call setup message including a QoS parameter and determine if said call requires a QoS guarantee by checking whether a QoS parameter is included in a call setup message, calculate a remaining bandwidth between the BTS and BSC, determine whether a remaining available bandwidth of the network connected to the base transceiver station can support a minimum data rate requirement based on the QoS of the call, assign the bandwidth and transmit a call establishment request signal to the base station transceiver if the bandwidth available can support the minimum data rate or if the call does not require the QoS guarantee;
said profile server being adapted to maintain a user profile database comprising QoS parameters and to provide QoS parameters to said base station if requested by said base station.

35. The system of claim 34, wherein said base station controller is adapted to determine whether radio resources are available for a call required to guarantee the QoS.

36. The system of claim 34, wherein said base station controller is adapted to assign a channel element if the data rate is supported and connect to the base transceiver station.

37. The system of claim 34, wherein said base station controller is adapted to admit the call by transmitting a call accept response signal to at least one of a GateWay and a Mobile Switching Center, and if a channel resource for non QoS subscriber is available.

38. The system of claim 34, wherein said base station controller is adapted to determine whether the data rate is supported if a minimum bandwidth required based on a QoS parameter for the call is available.

39. The system of claim 34, wherein said base station controller is adapted to determine whether the data rate is supported if a maximum bandwidth required based on a QoS parameter is available.

40. The system of claim 34, wherein said base station controller is adapted to determine whether the data rate is supported if the product of a minimum bandwidth and a selected first factor is available.

41. The system of claim 34, wherein said base station controller is adapted to determine whether the data rate is supported if the product of a maximum bandwidth and a selected second factor is available.

42. A system for establishing a call over a communication network according to the Quality of Service requirement for the call, the system comprising:
- a mobile station, a base transceiver station, a base station controller and a profile server;
- said base station controller being adapted to acquire user profile information of the mobile station from a profile server upon receipt of a call setup request message including a QoS parameter, compare the user profile information with the QoS parameter, determine whether radio resources are available by a difference between overall available bandwidth and bandwidth in use if the user profile information includes the QoS parameter, determine whether a remaining available bandwidth of the network connected to the base transceiver station can support a minimum data rate required based on the QoS requirements of the call if the radio resources are available, assign the bandwidth and radio resources, connect the base transceiver station, and transmit a call establishment request signal to the base transceiver station if the bandwidth can support the minimum data rate or if the call does not require the QoS guarantee;
- said profile server being adapted to maintain a user profile database comprising QoS parameters and to provide QoS parameters to said base station if requested by said base station.

43. The system of claim 42, wherein said base station controller is adapted to admit the call by transmitting a call accept response signal to at least one of a GateWay and a Mobile Switching Center, if a channel resource for non QoS subscriber is available.

44. The system of claim 42, wherein said base station controller is adapted to determine whether the data rate is supported if a minimum bandwidth required based on a QoS parameter for the call is available.

45. The system of claim 42, wherein said base station controller is adapted to determine whether the data rate is supported if a maximum bandwidth required based on a QoS parameter is available.

46. The system of claim 42, wherein said base station controller is adapted to determine whether the data rate is supported if the product of a minimum bandwidth and a selected first factor is available.

47. The system of claim 42, wherein said base station controller is adapted to determine whether the data rate is supported if the product of a maximum bandwidth and a selected second factor is available.

* * * * *